United States Patent [19]

Losack

[11] Patent Number: 5,290,456

[45] Date of Patent: Mar. 1, 1994

[54] FILTER PLATE FOR REMOVING HYDROCARBONS AND OTHER CONTAMINANTS FROM SOLUTIONS AND GASES

[75] Inventor: Billy J. Losack, Hondo, Tex.

[73] Assignee: Tuboscope Vetco International, Inc., Houston, Tex.

[21] Appl. No.: 934,110

[22] Filed: Aug. 20, 1992

[51] Int. Cl.$^5$ ................... B01D 37/00; B01D 29/07
[52] U.S. Cl. ................... 210/767; 210/321.72; 210/498; 210/499; 55/257.6; 428/136; 95/273; 95/274
[58] Field of Search ............... 210/767, 489, 499, 498, 210/474, 321.72, 649, 500.1, 321.75; 55/525, 257.6, 185, 98; 428/596, 136

[56] References Cited

U.S. PATENT DOCUMENTS

| | | | |
|---|---|---|---|
| 712,064 | 10/1902 | Heath | 428/136 |
| 1,663,298 | 3/1928 | Geer et al. | 210/498 |
| 2,800,423 | 7/1957 | De Swart | 428/136 |
| 3,655,501 | 4/1972 | Tesch | 428/136 |
| 4,740,303 | 4/1988 | Greutert et al. | 210/499 |
| 5,026,477 | 6/1991 | Yen | 210/284 |
| 5,076,924 | 12/1991 | Persson et al. | 210/489 |
| 5,080,944 | 1/1992 | Kauffman et al. | 428/136 |
| 5,082,708 | 1/1992 | Kauffman et al. | 428/136 |

Primary Examiner—Robert A. Dawson
Assistant Examiner—Ana M. Fortuna
Attorney, Agent, or Firm—Finnegan, Henderson, Farabow, Garrett & Dunner

[57] ABSTRACT

A filter plate for removing hydrocarbons and other contaminants from solutions and gases comprises a plate provided with rows of alternate perpendicular and parallel, substantially linear openings. A liquid and gas filtering apparatus comprises a container provided with the filter plate of the invention, means for inflow and outflow of water or air and means for introducing and removing filtering materials. A method of purifying a solution or a gas comprises removing impurities by passing the solution or gas through a filtering material supported on the filter plate of the invention. A method of removing hydrocarbons and other contaminants from a solution or gas comprises passing the solution or gas through a filtering material supported on the present filter plate. A method of reducing clogging when removing contaminants from a solution comprises passing the solution through a filtering material supported on the filter plate of this invention.

6 Claims, 1 Drawing Sheet

FILTER PLATE FOR REMOVING HYDROCARBONS AND OTHER CONTAMINANTS FROM SOLUTIONS AND GASES

BACKGROUND OF THE INVENTION

1. Field of the Invention

This invention relates to a filter plate for removing hydrocarbons and other contaminants from aqueous solutions and gases that relies on filtering the solution or gas through a filtering material supported by the plate of this invention provided with rows of linear substantially perpendicular openings. The present design of the filter plate is an improvement over prior art filter plates and is especially designed to reduce clogging due to accumulation of sludge and impurities. In addition, this invention relates to an apparatus for filtering an aqueous solution such as water and a gas such as air which utilizes the filter plate of the invention and to a method of removing hydrocarbons and other contaminants from, e.g., an aqueous solution or a gas such as air by passing the solution or the gas through a filtering material supported by the filter plate of the invention. This invention also relates to the use of the filter plate and apparatus for the removal of hydrocarbons and other contaminants from, a solution or a gas, particularly for decontaminating subsurface water and air.

2. Description of the Background

The purification of water is of importance, particularly water that is to be recycled for drinking and/or further domestic utilization.

Different kinds of contaminants are present in water and air which need to be substantially reduced or eliminated therefrom. For example, hydrocarbons and other contaminants such as solvents, particles such as dust, and the like, are harmful if present in air and water above a certain level. In order for water or air to become pure once again, the hydrocarbons and other contaminants must be substantially removed.

The prior art typically filtered water and/or air utilizing filters with openings that are spherical in nature. These tend to collect sludge over the round apertures, which clog the filter after a period of time.

Filters having apertures of different shapes are known in the art for applications other than the purification of water. For instance, Italian Patent No. 351,812 to Hagen and Luschel discloses a filter specifically suited for the preparation of coffed or other beverages like tea, and the like. The filter described in this patent has capillary cuts forming a 90° angle that are positioned symmetrically opposite one another.

U.S. Pat. No. 2,345,080 to Ardenne describes an arrangement for producing filters by making fine perforations in foil by means of ion rays.

U.S. Pat. No. 1,092,719 discloses a separator flume having a false bottom provided with triangular openings, each having a depressed lip at its base, the free end of the lip terminating at the base of the triangle and extending toward the opening. The apparatus described in this patent is intended for washing and separating sand and gravel and freeing the gravel from foreign matter.

Accordingly, there is still a need for an improved filter plate for use in the removal of hydrocarbons and other contaminants from water and gases that reduces clogging due to sludge and contaminant retention on the filter plate.

DISCLOSURE OF THE INVENTION

This invention relates to a filter plate for supporting filtering materials suitable for removing hydrocarbons and other contaminants from an aqueous solution or a gas, particularly subsurface water or air, that comprises a plate provided with rows of substantially linear openings of alternating perpendicular and parallel orientation.

This invention also relates to a filtering apparatus for aqueous solutions and gases that comprises an enclosed container provided with the filter plate of the invention;

means for inflow and outflow of liquid and/or gas; and means for introducing filtering meterials.

Still disclosed herein is a method of removing hydrocarbons and other contaminants from a solution such as an aqueous solution or a gas such as air that comprises passing the solution or gas through a filtering material supported on the filter plate of the invention.

A more complete appreciation of the invention and many of the attendant advantages thereof will be readily perceived as the same becomes better understood by reference to the following detailed description when considered in connection with the following drawings.

BRIEF DESCRIPTION OF THE DRAWINGS

The FIGURE depicts one orientation of the linear openings of the filter plate of the invention.

Other objects, advantages and features of the present invention will become apparent to those skilled in the art from the following discussion.

BEST MODE FOR CARRYING OUT THE INVENTION

Figure 1:
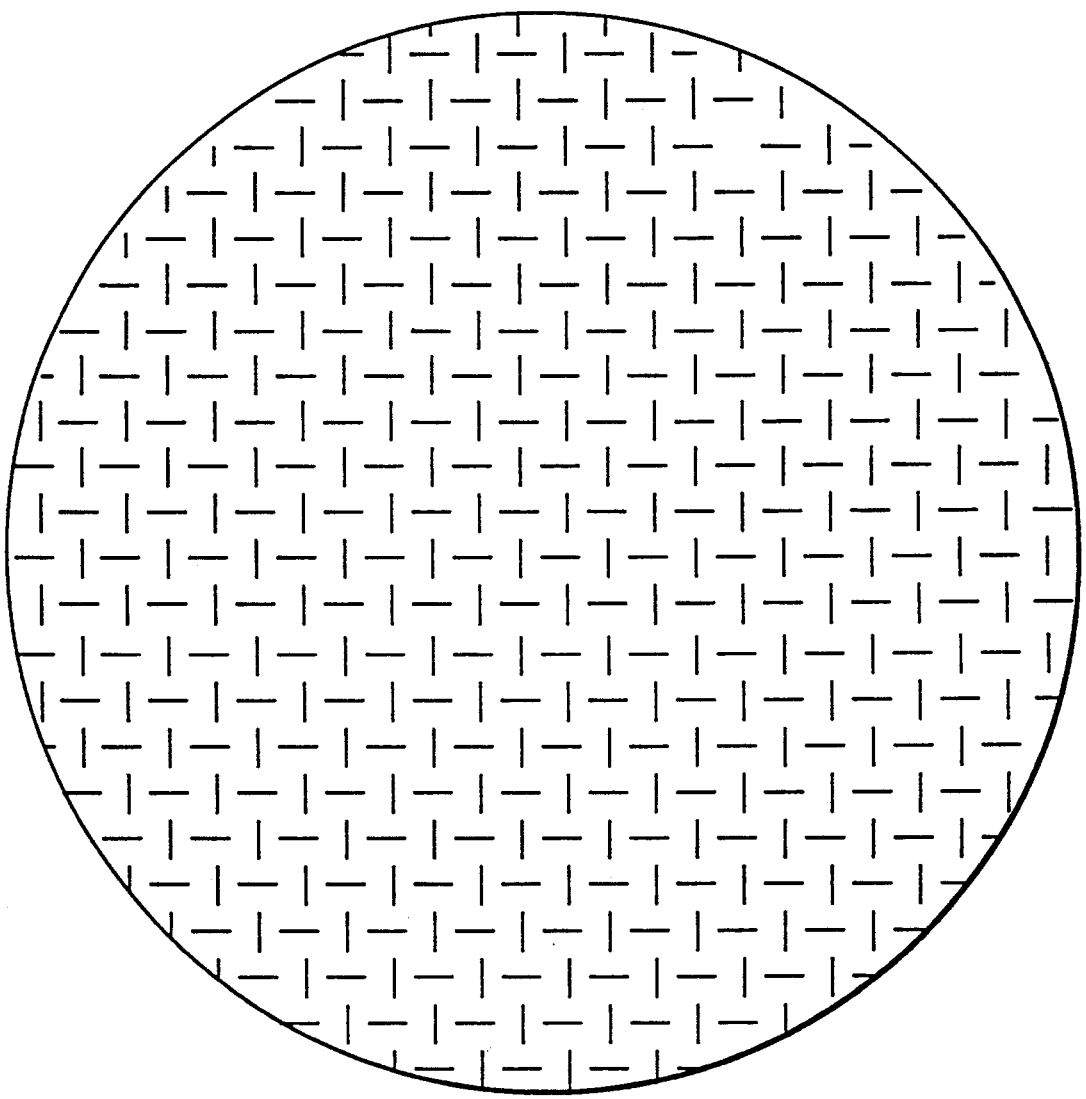

This invention arose from a desire by the inventor to improve on prior art technology for the purification of solutions and gases, particularly air and subsurface water, that are contaminated with, e.g., hydrocarbons, halogenated organic compounds and/or other contaminants.

The prior art provided for the filtration of water mostly with filter plates that have round apertures. This produces a substantial sludge or contaminant collection over and around the aperture in the filter and clogs the plate.

The filter plate provided herein comprises a plate provided with rows of substantially linear openings of a specific orientation.

The angle formed by the two differently positioned openings is about 85° to 95°, more preferably about 90°.

The plate utilized for the present invention may have any of a variety of shapes such as circular, square, rectangular, triangular, and the like. In fact, the plate may be manufactured in any shape and size, and be adapted to fit into any machinery utilized for the purification of aqueous solutions and gases. For exemplification purposes, the FIGURE accompanying this patent shows a circular plate, but plates of other shapes are suitable as well. The substantially linear openings are aligned in two substantially perpendicular directions as shown in the FIGURE. In another particularly preferred embodiment of the invention, the openings are aligned at an about 85° angle of one another. And in still another preferred embodiment, the openings are aligned at about 95° from one another.

The filter plate of the invention may be made of a variety of ferrous and non ferrous metals, such as iron alloys, stainless steel, ceramics and plastics. However, other materials may also be utilized as is known in the art, as long as they are substantially inert and do not contaminate the fluid or air that passes through the filter plate. The plate thickness, and its ratio to the plate diameter, are determined by the type of material utilized and its ability to withstand the pressure of the liquid or gas. Preferably, the filter plate material should be able to withstand liquid or gas pressures of up to about 100 psi, and more preferably up to about 250 psi, which are typical for processes of purification of water or air. However, an artisan will know how to modify these parameters without undue experimentation.

In one aspect of the invention, the substantially linear openings may have a length of about ⅛ to 2 inches, and preferably about ¼ to 1½ inches, and a width of about 1/16 to ¼ inch, preferably about ⅛ inch.

This invention also provides a liquid and gas filtering apparatus in the form of any apparatus known in the art, where the container provided for receiving the solution, e.g., liquid such as water or the gas such as air, to be purified is improved by a filter plate having the characteristics described herein. Thus, any known apparatus may be suited with a filter plate for removing hydrocarbons and other contaminants from liquid solutions such as aqueous solutions, solvents and the like,.and a gas such as air that comprises a plate provided with rows of substantially linear openings of alternating parallel and perpendicular orientation, and all the variations described above.

In a particularly preferred embodiment, the water or air filtering apparatus has a container provided with a bottom side, and the filter plate is positioned slightly above the bottom of the container to facilitate the flow. The filtering material(s) are placed on top of the plate inside the container. The filtering apparatus of the invention may be operated by gravity when it contains solely one vessel. When more than one vessel or filter are used, pressure may be necessary for forcing the, e.g., water or air in and out of the filtration chamber or container.

Also provided herein is a method of removing hydrocarbons and other contaminants from aqueous solutions or gases that comprises passing the solution or gases through a filtering material supported by the filter plate of the invention. The conditions under which this method is practiced are standard in the art and need not be further described herein. Given the material utilized for the manufacture of the filter plate and the characteristics of the apparatus, an artisan would know how to determine, without undue experimentation, a suitable flow rate at which the liquid may be circulated as well as the appropriate period of time before the filter may need to be cleaned, or the apparatus shut down.

In some instances, the filter plate of the invention has been used for a period of time greater than 3 years and for pumping in excess of 31,000,000 gallons of water per year, without having to stop the circulation of water or emptying the apparatus for cleaning the filter plate. However, the period of time that will elapse before there is substantial obstruction of the openings will depend on the degree of contamination of the water that is being filtered and whether or not a continuous flow is maintained. In some cases, when flow is stopped, clogging occurs shortly thereafter. Continuously flowing systems are exposed to clogging to a lesser extent.

Also provided herein is a method of reducing clogging when removing solid contaminants from liquid solutions or gases that comprises passing the solution or gas through a filtering material supported on the filter plate of the invention. As already indicated above, the period of time that it takes for the present filter plate to become clogged is substantially longer than for prior art filter plates.

The filter plate of the invention may be washed after being removed from a water filtering apparatus. This can be attained mechanically or by counter-circulation of a liquid such as water or an organic solvent in the opposite direction. Once the filter plate has been cleaned, it may be reinstalled and circulation restarted.

Filtering materials suitable for use herein are carbons such as charcoal, gravels, ionic resins, sands, and other materials known in the art.

The filtering material separated from the aqueous solution or gas may be cleaned, stored and reused or discarded in appropriate containers, optionally after biodegradation, if necessary.

EXAMPLE

Comparison of Filter Plate of the Invention with Prior Art Filter

A filter plate of 24 inches in diameter in accordance with the invention was utilized for the filtration of 7 million gallons per day of contaminated water in Alaska.

Two plates of the same dimensions were positioned at the same points of two water circulating system. One plate had circular apertures 3/8 inch in diameter and the other had longitudinal apertures ⅛ inch in width and 1½ inch in length with alternate perpendicular and parallel orientation at 90°.

Contaminated water was circulated for up to 13 months without requiring that the plate with the longitudinal apertures be cleaned. The plate with the circular openings became clogged 10 times during the same period of time and required that the apparatus be stopped, and the filter cleaned and replaced.

The invention now being fully described, it will be apparent to one of ordinary skill in the art that many changes and modifications can be made thereto without departing from the spirit or scope of the invention as set forth herein.

I claim:

1. A filtering apparatus for removing contaminants from a contaminated fluid, said apparatus comprising a filter plate and means for supporting the filter plate wherein the filter plate is adapted to support a filtering material, said plate having rows of substantially linear openings with at least every other of said rows being of alternating parallel and perpendicular orientation, means for providing inflow of said contaminated fluid to said filter plate and means for providing outflow of said fluid after filtering to remove contaminants therefrom.

2. The filtering apparatus of claim 1, wherein every other of said rows are of alternating parallel and perpendicular orientation.

3. The filtering apparatus of claim 2, wherein said filter plate is of a material capable of withstanding water or air pressure of about 2 to 1000 psi.

4. The filtering apparatus of claim 2 wherein the substantially linear openings have a width of about 1/16 to ¼ inch and a length of about ⅛ to 2 inches.

5. A method for removing solid contaminants from a contaminated fluid comprising passing said contaminated fluid through a filtering material supported on a filter plate having rows of substantially linear openings with at least every other of said rows being of alternating parallel and perpendicular orientation.

6. The method of claim 5, wherein every other of said rows are of alternating parallel and perpendicular orientation.

* * * * *